United States Patent [19]

Martin et al.

[11] 3,898,338

[45] Aug. 5, 1975

[54] 1,4-BIS-ACYLPIPERAZINE MUCOLYTIC PROCESS

[75] Inventors: Tellis Alexander Martin; William Timmey Comer, both of Evansville, Ind.

[73] Assignee: Mead Johnson & Company, Evansville, Ind.

[22] Filed: Apr. 8, 1974

[21] Appl. No.: 458,739

Related U.S. Application Data

[63] Continuation-in-part of Ser. No. 187,257, Oct. 7, 1971, Pat. No. 3,809,697.

[52] U.S. Cl. ................ 424/250; 424/2; 424/12
[51] Int. Cl. ............................................. A61k 27/00
[58] Field of Search ................................ 424/250, 2

[56] References Cited
UNITED STATES PATENTS

| | | | |
|---|---|---|---|
| 2,650,925 | 9/1953 | Ouperoff-Urime | 260/268 C |
| 2,901,481 | 8/1959 | Fusco | 260/268 C |
| 3,189,590 | 6/1965 | Coover | 260/268 C |
| 3,347,860 | 10/1960 | Frikura | 260/268 C |
| 3,511,840 | 5/1970 | Tesoro | 260/268 C |
| 3,660,398 | 5/1972 | Ley | 260/268 C |
| 3,726,880 | 4/1973 | Capps | 260/268 C |

FOREIGN PATENTS OR APPLICATIONS

| | | | |
|---|---|---|---|
| 196,810 | 5/1967 | U.S.S.R. | 260/268 C |

OTHER PUBLICATIONS

Chem. Abstracts, 6th Collective Index p. 9028s, Abstract Vol. 53, Col. 14940g.
Chemical Abstracts Vol. 68 Col. 29723c (Abstracting Japan 7,472) (1968).

*Primary Examiner*—Albert T. Meyers
*Assistant Examiner*—Norman A. Drezin
*Attorney, Agent, or Firm*—Robert E. Carnahan; Robert H. Uloth

[57] ABSTRACT

1,4-bis-Mercaptoacetyl and α-substituted mercaptoacetyl-piperazines are potent mucolytic agents which are effective both topically and systemically on oral or parenteral administration to animals.

7 Claims, 1 Drawing Figure

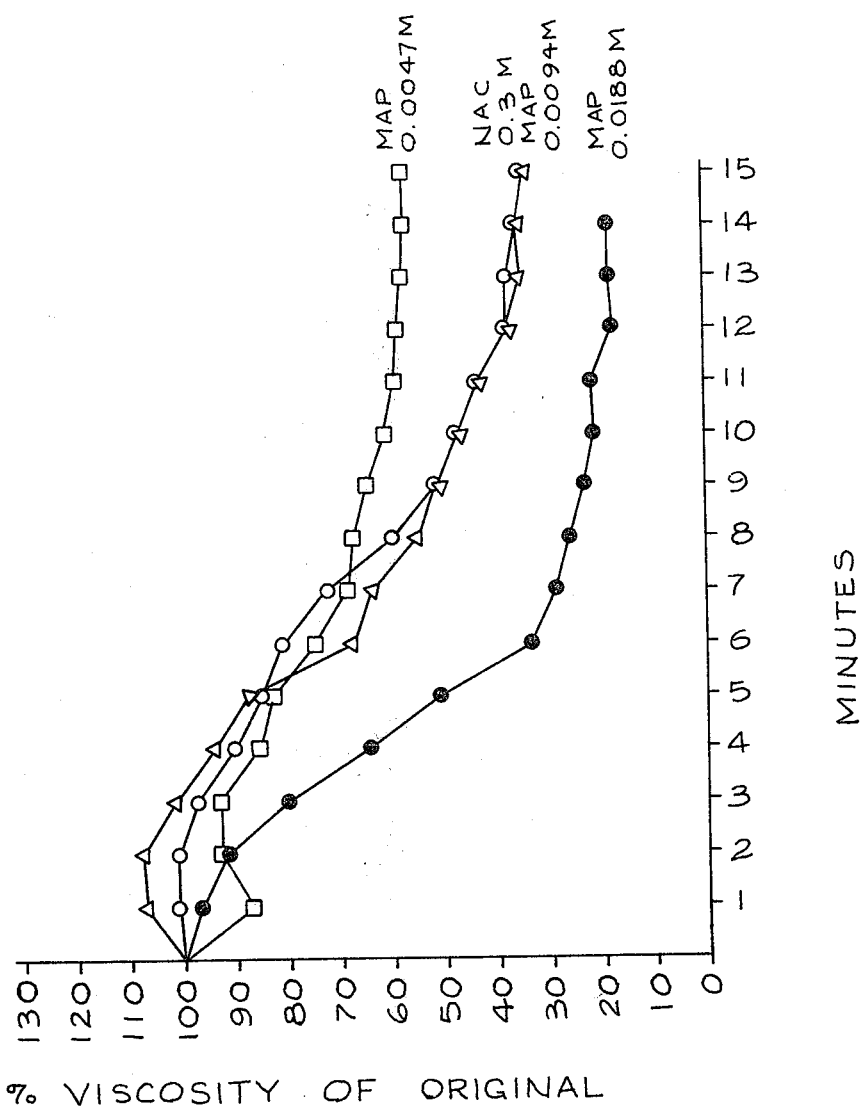
FIGURE 1. REDUCTION IN SPUTUM VISCOSITY BY N-ACETYLCYSTEINE (NAC) AND 1,4-bis-(MERCAPTOACETYL) PIPERAZINE (MAP)

1,4-BIS-ACYLPIPERAZINE MUCOLYTIC PROCESS

CROSS REFERENCE TO RELATED APPLICATION

This application is a continuation-in-part of copending patent application Ser. No. 187,257, filed Oct. 7, 1971, now U.S. Pat. No. 3,809,697, patented May 7, 1974.

FIELD OF THE INVENTION

This invention deals with a mucolytic process employing a group of novel organic compounds which includes 1,4-bis-(mercaptoacetyl)piperazine and homologs and analogs having an α-alkyl substituent on the mercaptoacetyl group and the S-acyl carboxylic esters thereof.

DESCRIPTION OF THE PRIOR ART

The following publications constitute the closest prior art known to the inventors with respect to this invention:

1. A. L. Sheffner, Ann. N.Y. Acad. Sci., 106, 298–310 (1963),
2. E. R. Atkinson, et al., J. Med. Chem., 8, 29–33 (1965),
3. T. Irikura, et al., ibid. 11, 801–804 (1968).

In reference No. 1, the testing of a variety of compounds for mucolytic activity in vitro was reported. In an attempt to correlate mucolytic activity with chemical structure, the author concluded that the free sulfhydryl group was necessary. N-Acetyl-L-cysteine was singled out for detailed study and this substance subsequently became commercially available under the trademark Mucomyst as a topically effective mucolytic agent. No piperazine derivatives were described.

While N-acetyl-L-cysteine has been a highly successful product and enjoys the leading market position for mucolytics, further improvement is nevertheless desirable with respect to potency and oral use. N-Acetyl-L-cysteine is administered by inhalation, a form of topical treatment, and has not been recommended for oral use as a mucolytic.

In reference No. 2 preparation of a variety of amides of thioglycolic acid was described and test results therewith as radio-protective agents summarized. No piperazine derivatives were described.

A series of 1,4-bis-acylpiperazines was described in reference No. 3. The only sulfur containing member of this series is 1,4-bis-(phenylthioacetyl)piperazine which was disclosed to have analgetic activity. No free sulfhydryl-containing compounds were described.

SUMMARY

The present invention provides the previously unknown compounds shown in Formula I.

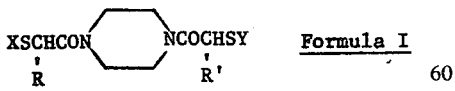

Formula I

In this formula, R and R' may be the same or different and are selected from the group consisting of hydrogen, and lower alkyl having 1 to 4 carbon atoms. R and R' are preferably the same and in the most preferred embodiments they are hydrogen. X and Y are selected from the group consisting of hydrogen, alkanoyl having up to 20 carbon atoms, and aroyl having from 6 to 11 carbon atoms. The salts of those substances in which X and Y are hydrogen are also part of the present invention. The preferred salts are those prepared from pharmaceutically acceptable bases including the sodium, potassium, calcium, barium, zinc, aluminum, magnesium, bismuth, and ammonium salts, and the salts of non-toxic organic bases such as the non-toxic primary, secondary, and tertiary aliphatic amines and quaternary ammonium bases, e.g., trimethylamine, triethylamine, ethanolamine, methylethanolamine, triethanolamine, benzyltrimethylammonium hydroxide, etc. In other words, in addition to hydrogen, alkanoyl, and aroyl as described above, X and Y may also be cationic salt forming species including ammonium, quaternary ammonium, pharmacologically acceptable metal ions, and pharmacologically acceptable protonated amines. "Pharmacologically acceptable" as used to describe the metal, ammonium, and amine salts refers to those cationic species which do not contribute appreciably to the toxicity of the product nor to its pharmacological activity. In other words, the cationic components of the salts of Formula I are pharmacologically inert.

The symmetrical compounds of Formula I in which X and Y are identical and R and R' are identical are preferred because they are easier and cheaper to manufacture. They are shown in Formula II in which the symbols R and X have the same meaning as above

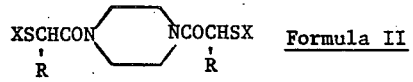

Formula II

The 1,4-bis(mercaptoacyl)piperazines of Formula I are useful as mucolytic agents. Those in which X and Y are hydrogen and the salts thereof are active in vitro, when applied topically, and systemically in animals. They are more potent than N-acetyl-L-cysteine. When administered orally, they have a prolonged duration of action as compared to N-acetyl-L-cysteine. The esters thereof, that is the compounds of Formula I, wherein X and Y are acyl groups of the type enumerated have little demonstrable mucolytic activity in vitro, but they are the full equivalents of the mercapto compounds and their salts in vivo on oral administration to mammals. They exhibit improved gastrointestinal tolerance on oral administration to mammals. By the oral and parenteral routes, non-toxic doses within the range of 2 – 500 mg./kg. of body weight are employed. Capsules, tablets, solutions, suspensions, etc. may be used for dosing. For topical application stabilized solutions or suspensions having concentrations at least about 0.5% by weight are used. Solutions in aqueous vehicles having concentrations of 0.5% to 5% by weight or dry powders are preferred for inhalation.

BRIEF DESCRIPTION OF THE DRAWINGS

FIG. 1 is made up of 4 graphs plotted on rectangular co-ordinates on the same set of axes. The ordinate is calibrated in percentage units with reference to the viscosity of the test sputum sample at the beginning of the experiment. The abscissa refers to time and is calibrated in minutes. The graphs depict the liquification of sputum samples on exposure to either N-acetylcysteine or 1,4-bis-(mercaptoacetyl)piperazine.

DESCRIPTION OF SPECIFIC EMBODIMENTS

The superior mucolytic activity of 1,4-bis(mercaptoacetyl)-piperazine as compared to N-acetylcysteine is demonstrable in vitro by the method of Lieberman, Am. J. Resp. Dis. 97, 662 (1968). This is a viscometric method which employs a cone-plate viscometer (Brookfield Engineering Laboratories, Inc., Stoughton, Mass.). According to this method 2 ml. of sputum is transferred to the center of the viscometer plate and the temperature is allowed to equilibrate. The plate is then rotated at gradually increasing speeds up to 100 r.p.m. during a two-minute period. This reduces the amount of sputum on the test plate to 1 ml. and reduces the viscosity of the speciment to a reproducible value which is necessary because of the thixotropic properties of sputum. The rotation rate is then reduced to give a convenient reading on the instrument, and a solution of the test drug having a volume of 0.2 ml. is then added to the sputum cup and viscosity readings as a percentage of the original are recorded at time intervals of 1 min. for a period of 15 min. Typical results are shown in FIG. 1.

FIG. 1 is a collection of 4 graphs in which the viscosity reading taken from the viscometer and expressed as a percentage value with respect to the viscosity of the specimen just prior to contact with the mucolytic agent (zero time) is plotted versus time at 1 min. intervals for 15 min. One of the graphs refers to the mucolytic effect of 0.3 M N-acetylcysteine, referred to in the graph as NAC and the other three graphs to the mucolytic effect of solutions having various concentrations of 1,4-bis(mercaptoacetyl)piperazine, referred to in the FIGURE as MAP. The FIGURE shows that the solution of MAP having a concentration of 0.0094 M has substantially the same mucolytic effect as a solution of NAC having a concentration of 0.3 M. On a molar basis MAP is therefore approximately 30 times as active as NAC and on an equivalent weight basis with respect to the sulfhydryl group, approximately 15 times as active.

When rats are treated orally with a dose of 180 mg./kg. (0.77 millimoles/kg.) of 1,4-bis(mercaptoacetyl)piperazine, plasma sulfhydryl concentration is elevated and remains so for at least 6 hrs., but returns to normal within 18 hrs. Similar results are obtained with a similar dose on a molar basis (245 mg./kg.) of 1,4-bis(acetylthioacetyl)piperazine which indicates that the body contains enzymes which cleave the thioester to the thiol compound. Lung sulfhydryl concentrations were also elevated following oral administration of either compound. Plasma sulfhydryl concentrations following oral administration of N-acetyl-L-cysteine (500 mg./kg., 3.07 millimoles/kg.) are elevated briefly following oral administration but return to normal within 6 hours.

Rats when exposed to an atmosphere containing approximately 450 ppm of $SO_2$ on a chronic basis secrete abnormally high amounts of mucus into the bronchial tree. This is reflected in the amount of solids collected from lung washings of the rats. Plasma sulfhydryl concentrations are also depressed by this treatment, and the cellular composition of the epithelium of the lung undergoes changes. These effects serve as paramenters which may be used to measure mucolytic activity in vivo.

Two groups of 10 rats each were exposed to an atmosphere containing 450 ppm of $SO_2$ for 3 hrs. a day, 6 days a week, until they had endured a total of 30 hrs. of exposure. During this time one group was treated orally with 180 mg./kg. of body weight per day of 1,4-bis(mercaptoacetyl)piperazine. A third group of 10 rats which was neither exposed to $SO_2$ nor treated was maintained as a control group. At the end of the experiment the animals were sacrificed, tracheal mucus collected and weighed, the volume of lung mucus measured by centrifuging lung washings, and blood plasma sulfhydryl concentrations assayed. The results are given in the following table. The enlarged mucus secretion and the depression of plasma sulfhydryl concentration which resulted from $SO_2$ exposure were significantly alleviated by the drug treatment.

EFFECT OF ORAL TREATMENT
WITH 1,4-bis(MERCAPTOACETYL)PIPERAZINE
ON RATS BREATHING 450 ppm OF $SO_2$ IN AIR: DOSE 180 mg./kg.

|  | TRA-CHEAL* MUCUS (mg.) | LUNG * MUCUS (mm.) | PLASMA * + SULFHYDRYL (Micromoles/ml.) |
|---|---|---|---|
| 1. Exposed to $SO_2$ and treated | 15.0 | 13.8 | 0.232 |
| 2. Exposed to $SO_2$ not treated | 33.0 | 29.2 | 0.190 |
| 3. Unexposed and untreated | none | 15.0 | 0.268 |

* Average
+ Determined colorimetrically according to the method of J. Sedalak and R.S. Lindsay Anal. Biochemistry 25, 192 (1968) using N-acetylcysteine as sulfhydryl in the color standard.

The compounds of Formula I are synthesized by the application of known methods for the preparation of mercaptans and thioesters. Useful intermediates for this purpose are the corresponding halogen compounds, namely the substances of Formula I wherein chlorine, bromine, or iodine are substituted for —SX and —SY. The 1,4-bis(haloacyl)-piperazines which serve as intermediates are converted to the mercaptoacyl compounds by reaction, for instance, with sodium hydrosulfide, sodium thiocarbonate, or potassium hydrosulfide. Alternatively, and preferably potassium thiolacetate may be caused to react with the 1,4-bis(haloacyl)piperazines by replacement of the halogen atoms with the $CH_3COS$-group. It has already been stated that these thioesters are of interest as biologically active and products in themselves in addition to serving as intermediates for preparing the 1,4-bis(mercaptoacyl)piperazines on hydrolysis.

The higher alkanoyl esters of Formula I may be prepared by esterification of the 1,4-bis(mercaptoacyl)-piperazines by reaction thereof with an acylating agent such as an acid chloride or anhydride. Alternatively, the 1,4-bis(haloacyl)piperazine intermediate may be caused to react with the sodium or potassium salt of the corresponding alkanoyl or aroyl thiolacid. The latter are prepared by reaction of $H_2S$ with the corresponding alkanoyl or aroyl halide or anhydride.

The unsymmetrical compounds of Formula I, that is those substances where R and R' are different from one another, or X and Y are different from one another, may be prepared by commencing with a piperazine having a readily removable blocking group on the nitrogen atom in the 1-position such as the ethoxycarbonyl, formyl, or the benzyl group. The haloacyl group is then introduced into the 4-position and further converted as described above to mercaptoacyl or an acylthio ester. The blocking group is then removed and the piperazine nitrogen atom in the 1-position is transformed in corresponding fashion with the desired acyl group.

The foregoing synthetic principles are illustrated by the following preparative procedures.

1. 1,4-bis(Chloroacetyl)piperazine — Chloroacetyl chloride, 153.6 grams (1.36 mol.) is added slowly with stirring to a mixture of 120 g. (0.62 mol.) of piperazine hexahydrate, and 136 g. (1.62 mol.) of sodium bicarbonate in 600 ml. of water. Cooling is used to maintain the reaction temperature in the range 15° – 25° C. The product precipitates in the course of the reaction and after stirring the mixture for several hours at room temperature, the product is collected by filtration, washed on the filter with water, and dried; yield 110 g. (74%), m.p. 133.5° – 136.5° C.

2. 1,4-bis(Acetylthioacetyl)piperazine — A mixture of 6 g. (0.025 mol.) of 1,4-bis(chloroacetyl)piperazine, 80 ml. of acetone, and 6.5 g. (0.0555 mol.) of potassium thiolacetate is warmed at 40°–45° C. 2 hrs. The mixture is concentrated by distillation of the acetone and the residue is stirred with water to yield 6.5 g. (82%) of the desired product, m.p. 143° – 144.5° C.

Anal. Calc. for $C_{12}H_{18}N_2O_4S_2$ C, 45.26; H, 5.70; N, 8.80. Found: C, 45.26; H, 5.64; N, 8.83.

3. 1,4-bis(Mercaptoacetyl)piperazine Disodium Salt — A mixture of 10.4 g. of 1,4-bis(acetylthioacetyl)piperazine and 250 ml. of ethanol is stirred under an atmosphere of nitrogen and 52 ml. (0.13 mol.) of 10% aqueous sodium hydroxide is added thereto. A clear solution forms from which the desired disodium slat precipitates as a white solid. The mixture is stirred for 2 hrs. at room temperature and then the product is collected by filtration. It is washed on the filter first with 3:2 ethanol-water and then with 95% aq. ethanol.

4. 1,4-bis(Mercaptoacetyl)piperazine — The disodium salt of the preceding preparation is dissolved in 160 ml. of methanol under an atmosphere of nitrogen and slowly treated with 14 ml. of 5 N ethanolic HCl. By-product sodium chloride is discarded after filtration, and the filtrate concentrated to one-half its volume by distillation. The product separates as a solid and is collected on a filter; yield 6 g. (75%), m.p. 107.5° – 109° C.

Anal. Calc. for $C_8H_{14}N_2O_2S_2$: C, 41.00; H, 6.02; N, 11.96. Found: C, 40.74; H, 5.99; N, 12.10.

5. 1,4-bis(2-Chloropropionyl)piperazine. — Except for the use of an equimolar amount 2-chloropropionyl chloride in place of chloroacetyl chloride, the procedure for the preparation of this compound is the same as that used in procedure 1; 56% yield. Recrystallization by dissolving in hot acetonitrile followed by dilution with isopropyl ether gives the pure product, m.p. 162.5° – 164° C.

6. 1,4-bis(2-Acetylthiopropionyl)piperazine. — A mixture of 10 g. (0.0375 mol.) of 1,4-bis(2-chloropropionyl)piperazine, 9.2 g. (0.08 mol.) of potassium thiolacetate and 200 ml. of acetone is heated overnight under reflux. The solvent is evaporated under reduced pressure. The residue is stirred with a mixture of chloroform and water. The organic layer is separated, washed with water, dried over anhydrous potassium carbonate, and concentrated to an oil. On solution of this oil in ethyl acetate-light petroleum ether, the product crystallized; yield, 7.7 g. (60%). Recrystallization from ethanol gives the purified compound; m.p. 131.5° – 133.5° C.

Anal. Calcd. for $C_{14}H_{22}N_2O_4S_2$: C, 48.53; H, 6.40; N, 8.09. Found: C, 48.77; H, 6.64; N, 8.12.

7. 1,4-bis(2-Mercaptopropionyl)piperazine. — To a mixture of 5 g. (0.0144 mol.) of 1,4-bis(2-acetylthiopropionyl)piperazine and 75 ml. of anhydrous ethanol stirred under an atmosphere of nitrogen there is added 32 ml. of 10% aqueous sodium hydroxide. The reaction mixture is stirred for 4 hrs. and then concentrated to an oil which is slurried with methanol and acidified with ethanolic hydrogen chloride. The resulting solid is collected and washed with methanol to give the crude product. It is purified by slurrying with water, filtering and washing first with water and then with acetone; yield, 3 g. (79%). Further purification is achieved by recrystallization from anhydrous ethanol; m.p. 171° – 172.5° C.

Anal. Calcd. for $C_{10}H_{18}N_2O_2S_2$: C, 45.77; H, 6.91; N, 10.68. Found: C, 45.90; H, 6.76; N, 10.62.

8. 1,4-bis(Propionylthioacetyl)piperazine. — To a mixture of 15 g. (0.0639 mol.) of 1,4-bis(mercaptoacetyl)piperazine and 250 ml. of chloroform under an atmosphere of nitrogen there is added slowly with stirring 57 ml. of 10% aqueous sodium hydroxide and then after cooling to 0°–5° C. 12 g. (0.129 mol.) of propionyl chloride during 10 min. After stirring overnight at room temperature, the organic layer is separated, washed with water, dried over anhydrous magnesium sulfate and concentrated to yield the solid product. The compound is purified by slurrying with warm ethyl acetate, filtering insoluble impurity, diluting the filtrate with light petroleum ether, and cooling; yield, 13.5 g. (61%). Further recrystallization from the same solvent combination yields the pure compound, m.p. 94° – 96° C.

Anal. Calcd. for $C_{14}H_{22}N_2O_4S_2$: C, 48.53; H, 6.40; N, 8.09. Found: C, 48.20; H, 6.25; N, 8.32.

9. 4-Chloroacetyl-1-formylpiperazine. — 1-Formylpiperazine is chloroacetylated in the manner described in procedure 1 to provide this intermediate.

10. 4-Acetylthioacetyl-1-formylpiperazine. — The reaction between 4-chloroacetyl-1-formylpiperazine and potassium thiolacetate is performed according to procedure 2 to provide this intermediate.

11. 1-Mercaptoacetylpiperazine. — Selective removal of the blocking formyl group from 4-acetylthioacetyl-1-formylpiperazine is accomplished by treatment with sodium hydride in dimethoxyethane. Hydrolysis of the thioester group also occurs under these conditions.

12. 1-Mercaptoacetyl-4-(2-mercaptopropionyl)piperazine. — 1-Mercaptoacetylpiperazine is converted to 1-mercaptoacetyl-4-(2-chloropropionyl)piperazine by reaction thereof with 2-chloropropionyl chloride according to Procedure 1 modified by substitution of these reactants. The resulting 1-mercaptoacetyl-4-(2-chloropropionyl)piperazine is then converted to the desired product by application of the methods of procedures 6 and 7 according to which the chloropropionyl group is successively transformed to acetylthiopropionyl and then to mercaptopropionyl.

13. 1,4-bis(Palmitoylthioacetyl)piperazine. — An equimolar amount of palmitoyl chloride is substituted for the propionyl chloride specified in Procedure 8 and the procedure is then repeated as described to provide the desired bis-pamitoyl ester.

14. 1,4-bis(n-Octanoylthioacetyl)piperazine. — The method of Procedure 8 is repeated with substitution an equimolar basis of n-octanoyl chloride for the propionyl chloride specified there.

15. 1,4-bis(Benzoylthioacetyl)piperazine. — The method of Procedure 8 is repeated with substitution of an equimolar amount of benzoyl chloride for the propionyl chloride specified in that method; m.p. 188°– 192° C.; 77% yield.

Anal. Calcd. for $C_{22}H_{22}N_2O_4S_2$: C, 59.71; H, 5.01; N, 6.33. Found: C, 59.65; H, 5.12, N, 6.41.

16. 1,4-bis(2-Mercaptopentanoyl)piperazine. — Two molecular portions of 2-chloropentanoyl chloride are allowed to react with 1 molecular portion piperazine hexahydrate according to the method of procedure 1. The resulting 1,4-bis(2-chloropentanoyl)piperazine is then converted to the desired product by reaction with potassium thiolacetate according to the method of procedure 6 to provide 1,4-bis(2-acetylthiopentanoyl)-piperazine, one of the products of the present invention. The latter is then hydrolyzed according to the method of procedure 7 to give the named product.

17. Salts. — Salts of the products of procedures 4, 7, 12, and 16 with pharmaceutically acceptable bases are prepared by reaction of chemically equivalent amounts with respect to the SH group of the pharmaceutically acceptable base and the mercaptoacyl compound in a reaction inert solvent such as water, ethanol, or in the judgment of the chemist a relatively non-polar organic solvent such as ether or ethyl acetate. Suitable bases include sodium hydroxide, sodium carbonate, potassium hydroxide, potassium bicarbonate, calcium hydroxide, barium hydroxide, aluminum hydroxide, zinc hydroxide, triethanolamine, triethylamine, diethylamine, tetramethylammonium hydroxide, benzyltrimethylammonium hydroxide, etc. The salt is recovered by filtration or evaporation.

The compounds of Formula I may be administered by inhalation in powdered form or as aqueous solutions. The esters, those substances wherein X and Y are acyl groups as defined above, while having only low activity in vitro are active mucolytic agents when brought into contact with lung tissue. Animal experiments have shown that when an ester of Formula I is contacted with rat lung homogenate, the sulfhydryl compound is liberated (Formula I, X and/or Y, hydrogen). From a pharmaceutical standpoint, the esters are preferred for dosage by inhalation due to their relative lack of taste and odor. Individual doses for inhalation by man are within the range of 5–100 mg., and preferably 10–40 mg., which may be repeated at intervals. The following compositions illustrate inhalation dosage forms.

A. Powder For Administration via Inhaler Device.-

| | |
|---|---|
| 1,4-bis(Acetylthioacetyl)piperazine, micronized | 2.5 g. |
| Lactose powder | 2.5 g. |

The powders are blended asceptically and filled into hard gelatin capsules each containing 50 mg. of the mixture. This is suitable for dispersion into the inspired breath by means of a breath-operated inhaler device containing means for rupture of the capsule wall prior to dosing.

B. Pressurized Aerosol Dispersion For Delivery of a Powder.-

| | |
|---|---|
| 1,4-bis(Mercatoacetyl)piperazine, micronized | 6.25 g. |
| Oleyl Alcohol | 0.1 g. |
| Dichlorodifluoromethane | 25.0 g. |
| Dichlorotetrafluoroethane | 68.65 g. |

The micronized drug is dispersed in a solution of the other ingredients which has been cooled to −20°C. and filled into a chilled aerosol container having a metered valve arranged to deliver 80 mg. of the composition at a single dose. This dose contains 5 mg. of active ingredient.

C. Lyophilized Powder for Reconstitution. — A solution of 10 g. of 1,4-bis(acetylthioacetyl)piperazine and 90 g. of mannitol in 4 l. of water is sub-divided equally into 1,000 ampoules. The ampoules are frozen and the frozen mixture lyophilized to dryness. The ampoules are then sealed or capped. For use, each ampoule is reconstituted with 4 ml. of a solution having the following composition.

Sodium chloride, 0.4% w/w
Sodium hydroxide or hydrochloric acid, q.s. pH 6.5
Purified water, qs. 4.0 ml.

D. Sterile Lyophilized Powder — A solution of 20 g. of 1,4-bis(acetylthioacetyl)piperazine and 20 g. of polyvinylpyrrolidone $C^-30$ (average molecular weight about 40,000) is dissolved in 8 l. of water, sub-divided into 1000 sterile glass vials using a sterilizing filter and asceptically lyophilized to dryness. The vials are sealed until needed for reconstitution and use. A suitable solvent for reconstitution is sterile aqueous 0.9% sodium chloride in purified water adjusted to pH 6.5. A 20 mg. dose of the composition is reconstituted with 4 ml. of this vehicle before use.

Composition C and D may be administered by conventional nebulizing apparatus or by an intermitent positive pressure breathing apparatus.

What is claimed is:

1. The process for relieving mucus congestion of the mammalian respiratory tract which comprises administering orally to a mammal having respiratory mucus congestion an effective mucolytic non-toxic dose of from 2 to 500 mg./kg. of body weight of a compound selected from the group consisting of 1,4-bis-acylpiperazines having the formula

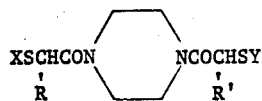

wherein R and R' are hydrogen or lower alkyl having 1 to 4 carbon atoms and X and Y are hydrogen, alkanoyl having up to 20 carbon atoms or benzoyl, and the salts of those substances wherein X and Y are hydrogen with pharmaceutically acceptable bases.

2. The process of claim 1 wherein an oral dose of 1,4-bis-(mercaptoacetyl)piperazine is employed.

3. The process of claim 1 wherein an oral dose of 1,4-bis-(acetylthioacetyl)piperazine is employed.

4. The process for relieving mucous congestion of the mammalian respiratory tract which comprises administering by inhalation to a mammal having respiratory mucous congestion an effective mucolytic dose of from 5 to 100 mg. of a compound selected from the group of 1,4-bis-acylpiperazines having the formula

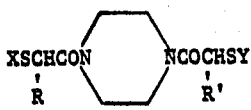

wherein R and R' are hydrogen or lower alkyl having 1 to 4 carbon atoms and X and Y are hydrogen, alkanoyl having up to 20 carbon atoms or benzoyl, and the salts of those substances wherein X and Y are hydrogen with pharmaceutically acceptable bases.

5. The process of claim 4 wherein 1,4-bis(mercaptoacetyl)-piperazine is employed.

6. The process of claim 4 wherein 1,4-bis(acetylthioacetyl)-piperazine is employed.

7. The mucolytic process which comprises contacting animal mucus in vitro with an effective mucolytic amount of a compound selected from the group consisting of 1,4-bis-acylpiperazines having the formula

wherein R and R' are hydrogen or lower alkyl having 1 to 4 carbon atoms and the salts thereof with pharmaceutically acceptable bases.

* * * * *